US011435543B2

(12) United States Patent
Kimura et al.

(10) Patent No.: US 11,435,543 B2
(45) Date of Patent: Sep. 6, 2022

(54) OPTICAL FIBER UNIT AND OPTICAL FIBER CABLE

(71) Applicant: SUMITOMO ELECTRIC INDUSTRIES, LTD., Osaka (JP)

(72) Inventors: Toyoaki Kimura, Osaka (JP); Fumiaki Sato, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/015,979

(22) Filed: Sep. 9, 2020

(65) Prior Publication Data

US 2021/0072477 A1 Mar. 11, 2021

(30) Foreign Application Priority Data

Sep. 11, 2019 (JP) .............................. JP2019-165282

(51) Int. Cl.
*G02B 6/44* (2006.01)
(52) U.S. Cl.
CPC .................................. *G02B 6/447* (2013.01)
(58) Field of Classification Search
CPC ....................................................... G02B 6/447

USPC ........................................................ 385/114
See application file for complete search history.

(56) References Cited

U.S. PATENT DOCUMENTS 10,705,308 B1 * 7/2020 Bureacov ............. G02B 6/3616
2009/0022460 A1 * 1/2009 Lu et al. .............. G02B 6/4475
385/114

FOREIGN PATENT DOCUMENTS

| EP | 1081519 A1 * | 3/2001 | ........... G02B 6/4482 |
| JP | 2013-190641 A | 9/2013 | |
| WO | WO-2016208228 A1 * | 12/2016 | ............... G02B 6/44 |
| WO | WO-2017122518 A1 * | 7/2017 | ........... G02B 6/4482 |

* cited by examiner

*Primary Examiner* — Jerry M Blevins
(74) *Attorney, Agent, or Firm* — Faegre Drinker Biddle & Reath LLP

(57) ABSTRACT

An optical fiber unit includes an optical fiber ribbon in which a plurality of optical fibers are arranged in parallel, and a colored bundle tape which is longitudinally wrapped or spirally wrapped around an optical fiber ribbon bundle in which the plurality of optical fiber ribbons are stranded together. One end portion in a width direction of the bundle tape and the other end portion in the width direction of the bundle tape overlap each other and are joined to each other, and the bundle tape covers an entire circumference of the optical fiber ribbon bundle.

6 Claims, 4 Drawing Sheets

OPTICAL FIBER UNIT AND OPTICAL FIBER CABLE

CROSS-REFERENCE TO RELATED APPLICATION

The present application claims priority from Japanese Patent Application No. 2019-165282 filed on Sep. 11, 2019, the entire content of which is incorporated herein by reference.

BACKGROUND

Technical Field

The present disclosure relates to an optical fiber unit and an optical fiber cable.

Related Art

In a related art, there is known an optical fiber cable provided with an optical fiber unit including a plurality of optical fiber ribbons in which a plurality of optical fibers are arranged in parallel.

In the above-described optical fiber cable, it is required to identify each optical fiber for wiring, and an optical fiber unit in which a bundle yarn for identification is wound around a bundle of optical fiber ribbons is known (For example, refer to Patent Document 1).

[Patent Document 1] JP-A-2013-190641

In the optical fiber unit described in Patent Document 1, two identification yarns are spirally wound around a bundle of optical fibers.

However, since a thickness of the identification yarn is approximately the same as that of the optical fiber, it cannot be said that this identification method is sufficient in view of identifiability of the optical fiber unit, and there is room for further improvement.

SUMMARY

The present disclosure has been made in consideration of the above-described circumstances, and an object thereof is to provide an optical fiber unit having excellent identifiability and an optical fiber cable.

An optical fiber unit according to an exemplary embodiment comprising:

an optical fiber ribbon in which a plurality of optical fibers are arranged in parallel; and a colored bundle tape which is longitudinally wrapped or spirally wrapped around an optical fiber ribbon bundle in which the plurality of optical fiber ribbons are stranded together, wherein one end portion in a width direction of the bundle tape and the other end portion in the width direction of the bundle tape overlap each other and are joined to each other, and the bundle tape covers an entire circumference of the optical fiber ribbon bundle.

An optical fiber cable according to an exemplary embodiment, wherein the plurality of optical fiber units are housed in a cable sheath.

According to the exemplary embodiment, it is possible to provide an optical fiber unit having excellent identifiability and an optical fiber cable.

DETAILED DESCRIPTION

Description of Embodiments of the Invention

Figure 1:
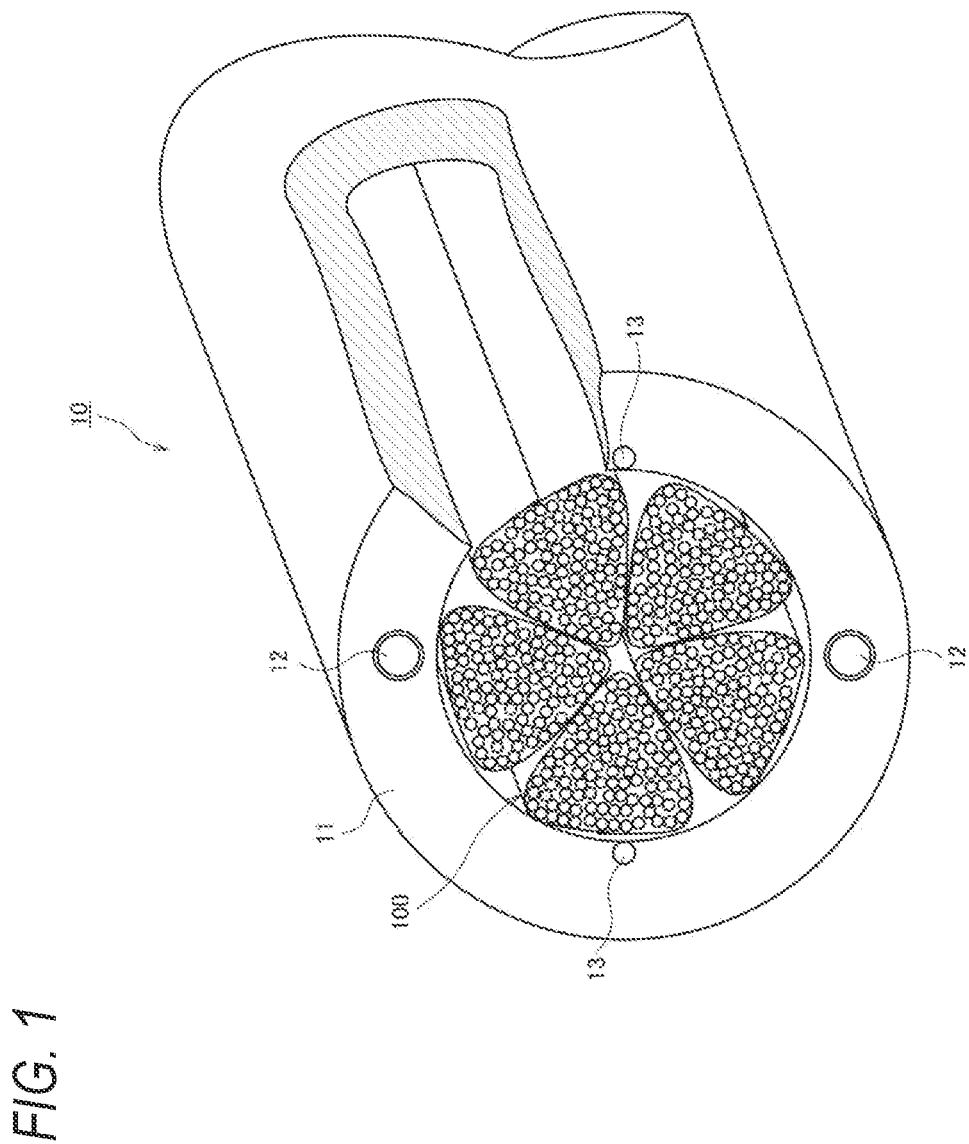
FIG. 1 is a cross-sectional view of an optical fiber cable according to a first exemplary embodiment.

Initially, contents of an embodiment of the invention will be listed and described.

(1) An optical fiber unit according to an exemplary embodiment comprising:

an optical fiber ribbon in which a plurality of optical fibers are arranged in parallel; and a colored bundle tape which is longitudinally wrapped or spirally wrapped around an optical fiber ribbon bundle in which the plurality of optical fiber ribbons are stranded together, wherein one end portion in a width direction of the bundle tape and the other end portion in the width direction of the bundle tape overlap each other and are joined to each other, and the bundle tape covers an entire circumference of the optical fiber ribbon bundle.

According to the optical fiber unit configured in this manner, the colored bundle tape covers the entire circumference of the optical fiber ribbon bundle. For this reason, a colored region becomes larger than a case where an identification string having approximately the same thickness as that of the optical fiber is wound around the optical fiber ribbon bundle to identify the optical fiber ribbon bundle, the optical fiber ribbon bundle can be more easily identified.

Furthermore, one end portion in the width direction of the bundle tape and the other end portion in the width direction of the bundle tape overlap each other and are joined to each other, and the bundled tape covers the entire circumference of the optical fiber ribbon bundle. For this reason, it is difficult to remove an overlapped state of the bundle tape as compared with a case where the bundle tapes simply overlap each other, the optical fiber ribbon bundle can be prevented from collapsing even though a force is applied to the optical fiber unit from the outside.

Therefore, according to the optical fiber unit configured as described above, it is possible to prevent the optical fiber ribbon bundle from collapsing while improving identifiability of the optical fiber ribbon bundle.

(2) In the above described optical fiber unit, an identification mark is provided on an outer surface of the bundle tape.

Accordingly, since the optical fiber unit around which the bundle tape is wrapped can be identified by a shape and coloring of the mark in addition to the coloring of the bundle tape, the identifiability of the optical fiber unit can be improved.

(3) In the above described optical fiber unit, a slit extending in a longitudinal direction of the bundle tape is formed in the bundle tape.

Accordingly, rigidity of the bundle tape deteriorates and the bundle tape can be easily extended in a short-length direction, and the bundle tape more easily adheres to the optical fiber unit. For this reason, an outer diameter of the optical fiber unit can be reduced.

(4) In the above described optical fiber unit, the bundle tape is a tape that shrinks when heat is applied thereto.

Accordingly, since the bundle tape can adhere to the optical fiber ribbon bundle by applying heat to the bundle tape, it is possible not only to cause the optical fiber unit to have a smaller diameter, but also to prevent the optical fiber ribbon bundle from collapsing.

When the optical fiber unit is housed in the optical fiber cable, the optical fiber cable can house the optical fiber unit with a high density.

(5) In an optical fiber cable according to the exemplary embodiment, the plurality of optical fiber units according to any one of the above (1) to (4) are housed in a cable sheath.

Accordingly, since the optical fiber cable includes the optical fiber unit having excellent identifiability, the optical fiber cable can house a larger number of optical fiber units in an easily identifiable state as compared with a related-art optical fiber cable in which the optical fiber unit is identified by an identification yarn.

Details of Embodiments of the Invention

First Exemplary Embodiment

Hereinafter, a specific cable structure of an optical fiber cable 10 according to a first exemplary embodiment of the present disclosure will be described with reference to FIGS. 1 to 3.

Figure 2:
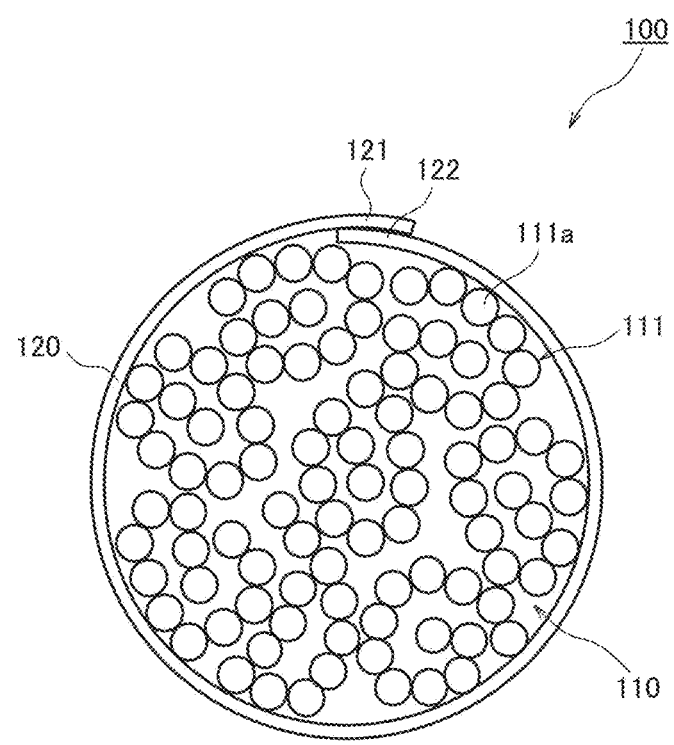
FIG. 2 is a cross-sectional view of an optical fiber unit according to the first exemplary embodiment.
Figure 3:
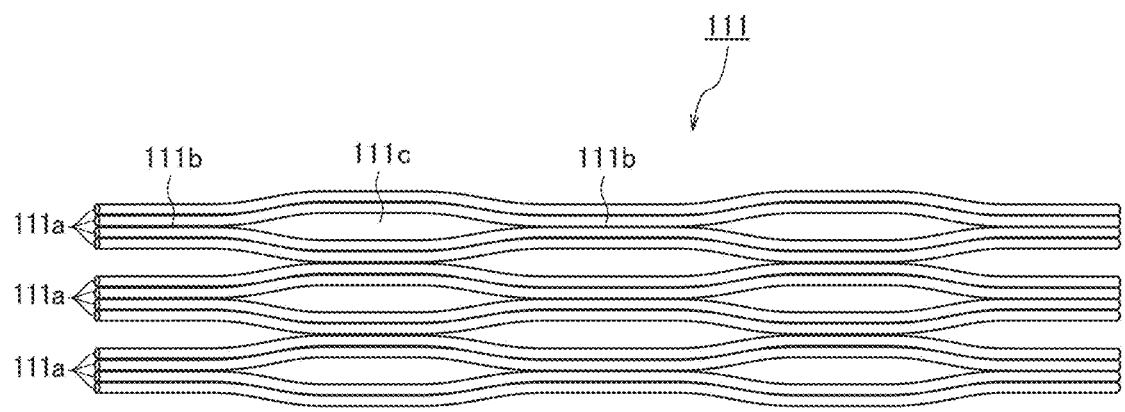
FIG. 3 is a plan view of an optical fiber ribbon.

FIG. 1 is a cross-sectional view of an optical fiber cable according to the first exemplary embodiment, FIG. 2 is a cross-sectional view of an optical fiber unit according to the first exemplary embodiment, and FIG. 3 is a plan view of an optical fiber ribbon.

In the following description, configurations denoted by the same reference signs are regarded as the same configurations even in different drawings, and the description thereof may be omitted.

The present disclosure is not limited to the following examples but is indicated by the scope of the claims, and is intended to include all the modifications within meanings equivalent to the scope of the claims and within the scope.

Optical Fiber Cable

First, the specific cable structure of the optical fiber cable 10 will be described with reference to FIG. 1.

As illustrated in FIG. 1, the optical fiber cable 10 includes: a cable sheath 11 that covers the outside of a plurality of optical fiber units 100 and houses the plurality of the optical fiber units 100; a tension member 12 that protects the optical fiber unit 100 from a tension applied during installation; and a tear string 13 for tearing the cable sheath 11.

The cable sheath 11 is, for example, high density polyethylene, and its Young's modulus is approximately 800 Pa to 1000 Pa.

The tension member 12 is a wire material having resistance with respect to tension and compression, such as a steel wire and a fiber reinforced plastic (FRP). As illustrated in FIG. 1, two tension members 12 are embedded inside the cable sheath 11 and are opposite to each other.

As illustrated in FIG. 1, two tear strings 13 are also embedded inside the cable sheath 11 and are opposite to each other.

As illustrated in FIG. 1, the tension member 12 and the tear string 13 are arranged at a distance from each other.

Optical Fiber Unit

Next, the optical fiber unit 100 will be described with reference to FIGS. 2 and 3.

The optical fiber unit 100 includes: an optical fiber ribbon bundle 110 obtained by stranding a plurality of optical fiber ribbons 111 in which a plurality of optical fibers 111a are arranged in parallel; and a bundle tape 120 longitudinally wrapped along a longitudinal direction of the optical fiber ribbon bundle 110.

As illustrated in FIG. 3, for example, the optical fiber ribbon 111 is an intermittent ribbon configured with a splicing region 111b in which the adjacent optical fibers 111a are spliced together and a non-splicing region 111c in which the adjacent optical fibers 111a are separated from each other, and is formed of twelve optical fibers 111a in this exemplary embodiment.

A diameter of the optical fiber 111a in the exemplary embodiment is approximately 0.25 mm.

The bundle tape 120 is formed of, for example, a colored nonwoven fabric, and has a thickness of approximately 0.03 mm.

The thickness of the bundle tape 120 is set to approximately 0.03 mm, whereby both flexibility and dismantling property (easiness of cutting by hand) of the bundle tape 120 can be achieved.

As illustrated in FIG. 2, the bundle tape 120 covers the entire circumference of the optical fiber ribbon bundle 110.

One end portion 121 in a width direction of the bundle tape 120 and the other end portion 122 in the width direction of the bundle tape 120 overlap each other and are joined to each other.

The joining of the end portions of the bundle tape 120 may be performed by adhesive bonding, thermocompression bonding, ultrasonic welding, or self-fusion.

It is desirable that an overlap margin between one end portion 121 in the width direction of the bundle tape 120 and the other end portion 122 in the width direction thereof is, for example, approximately 1% to 25% of the width of the bundle tape 120.

In the optical fiber unit 100 according to the first exemplary embodiment of the present disclosure which is obtained as described above, a colored region of the optical fiber ribbon bundle becomes larger than a case where an identification yarn having approximately the same thickness as that of the optical fiber is wound around the optical fiber ribbon bundle to identify the optical fiber ribbon bundle since the colored bundle tape 120 covers the entire circumference of the optical fiber ribbon bundle 110. For this reason, the optical fiber ribbon bundle 110 can be more easily identified.

Since one end portion 121 in the width direction of the bundle tape 120 and the other end portion 122 in the width direction of the bundle tape 120 overlap each other and are joined to each other, and the bundled tape 120 covers the entire circumference of the optical fiber ribbon bundle 110 such that it is difficult to remove an overlapped state of the bundle tape 120 as compared with a case in which the bundle tapes 120 simply overlap each other, the optical fiber ribbon bundle 110 can be prevented from collapsing even though a force is applied to the optical fiber unit 100 from the outside.

Therefore, according to the optical fiber unit 100 configured as described above, it is possible to prevent the optical fiber ribbon bundle 110 from collapsing while improving identifiability of the optical fiber ribbon bundle 110.

Since the optical fiber cable 10 according to the first embodiment of the present disclosure includes the optical fiber unit 100 having excellent identifiability, the optical fiber cable 10 can house a larger number of optical fiber units 100 in a state where the optical fiber units 100 are easily identified as compared with a related-art optical fiber cable in which the optical fiber unit is identified by an identification yarn.

Second Exemplary Embodiment

Next, an optical fiber unit according to a second exemplary embodiment of the present disclosure will be described with reference to FIG. 4.

Figure 4:
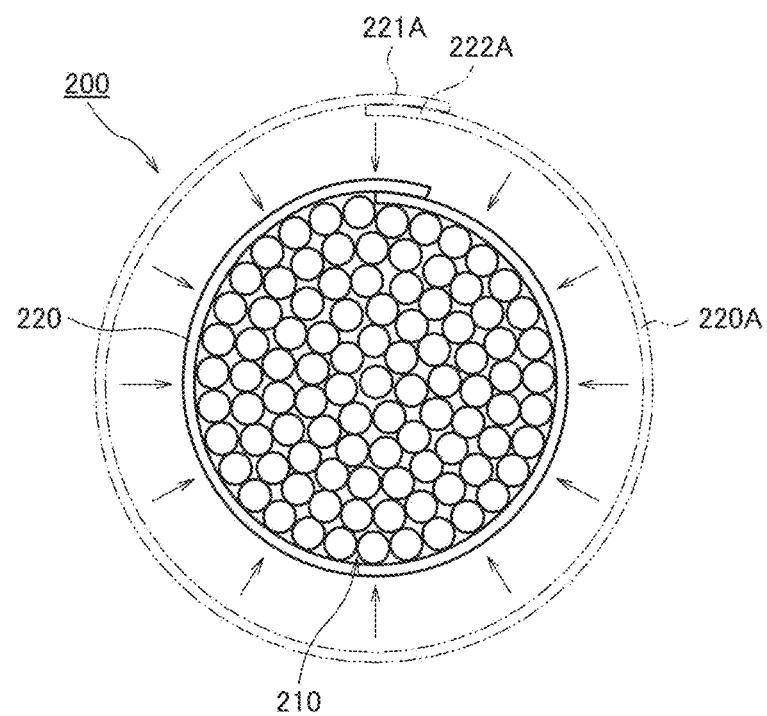
FIG. 4 is a cross-sectional view of an optical fiber unit according to a second exemplary embodiment.

FIG. 4 is a cross-sectional view of the optical fiber unit according to the second embodiment.

An optical fiber unit 200 of the second exemplary embodiment is obtained by changing a material of the bundle tape 120 in the optical fiber unit 100 of the first exemplary embodiment. Since the optical fiber unit 200 includes many elements in common with the optical fiber unit 100 of the first exemplary embodiment, the detailed description of the common elements will be omitted, and only the reference numbers in the 200s having the same last two digits will be given.

A bundle tape 220 in the optical fiber unit 200 of the second exemplary embodiment is a polyethylene terephthalate (PET)-based or polylactic acid (PLA)-based tape, and is formed by its shrinkage by applying heat of 70° C. to 100° C.

A thickness of the bundle tape 220 is approximately 0.03 mm.

In the exemplary embodiment, as is the case with the first embodiment, a bundle tape 220A before thermal shrinkage covers an entire circumference of an optical fiber ribbon bundle 210.

Furthermore, one end portion 221A in the width direction of the bundle tape 220A and the other end portion 222A in the width direction of the bundle tape 220A overlap each other and are joined to each other.

In the exemplary embodiment, after the end portions of the bundle tape 220A are joined to each other, heat is applied to the bundle tape 220A for the shrinkage thereof.

That is, though a space is formed between the bundle tape 220A and the optical fiber ribbon bundle 210 before the thermal shrinkage is performed, the bundle tape 220A shrinks by heat, whereby the bundle tape 220 after the thermal shrinkage becomes in a state of adhering to the optical fiber ribbon bundle 210.

In the optical fiber unit 200 according to the second exemplary embodiment of the present disclosure which is obtained as described above, since the bundle tape 220 after the thermal shrinkage adheres to the optical fiber ribbon bundle 210 by applying the heat to the bundle tape 220A before the thermal shrinkage, it is possible not only to cause the optical fiber unit 200 to have a smaller diameter, but also to prevent the optical fiber ribbon bundle 210 from collapsing.

When the optical fiber unit 200 is housed in the optical fiber cable 10, the optical fiber cable 10 can house the optical fiber unit 200 with a high density.

Exemplary Modification

While the exemplary embodiment of the present disclosure has been described above, the present disclosure is not limited thereto.

Further, the respective elements provided in the above-described exemplary embodiment can be combined with each other as long as a combination of the respective elements is technically possible, and the combination thereof is also included in the scope of the present disclosure as long as the combination thereof includes features of the present disclosure.

For example, though the number of tension members is two in each of the above-described exemplary embodiments, the number thereof is not limited thereto.

Although the number of tear strings is two in each of the above-described exemplary embodiments, the number thereof is not limited thereto.

For example, while the optical fiber ribbon bundle is formed of eight optical fiber ribbons in each of the above-described exemplary embodiments, the number of the optical fiber ribbons is not limited thereto, and may be any number as long as a plurality of optical fiber ribbons are used.

While the optical fiber ribbon is formed of twelve optical fibers in each of the above-described exemplary embodiments, the number of optical fibers is not limited thereto, and may be any number as long as a plurality of optical fibers are used.

For example, while the optical fiber ribbon has the intermittent structure configured with the splicing region and the non-splicing region in each of the above-described exemplary embodiments, the optical fiber ribbon may not include the non-splicing region.

For example, while the diameter of the optical fiber is approximately 0.25 mm in each of the above-described exemplary embodiments, the diameter of the optical fiber is not limited thereto, and may be, for example, a smaller diameter of approximately 0.165 mm to approximately 0.22 mm.

For example, while the thickness of the bundle tape is approximately 0.03 mm in each of the above-described exemplary embodiments, the thickness of the bundle tape is not limited thereto.

For example, while the bundle tape 220 is the polyethylene terephthalate (PET)-based or polylactic acid (PLA)-based tape in the second exemplary embodiment, a material of the bundle tape 220 is not limited thereto as long as a material that shrinks when heat is applied thereto is used.

For example, while nothing is formed on an outer surface of the bundle tape in each of the above-described exemplary embodiments, an identification mark may be provided on the outer surface of the bundle tape.

By providing the identification mark on the outer surface of the bundle tape, the optical fiber unit around which the bundle tape is wrapped can be identified by a shape and coloring of the mark in addition to the coloring of the bundle tape. For this reason, the identifiability of the optical fiber unit can be improved.

Figure 5:
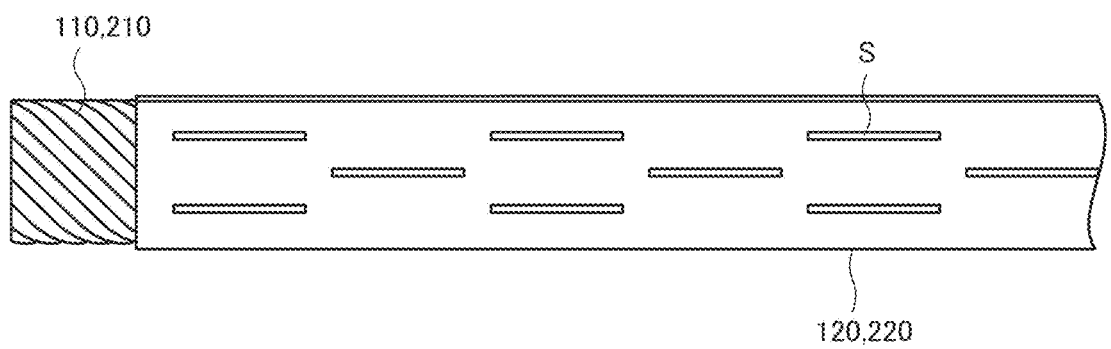
FIG. 5 is a side view illustrating a first exemplary modification of the optical fiber unit.

Alternatively, as illustrated in FIG. 5, which is a side view illustrating a first exemplary modification of the optical fiber unit, a plurality of slits S extending in the longitudinal direction may be formed on the surface of the bundle tape.

By providing the slit S extending in the longitudinal direction on the surface of the bundle tape, the bundle tape can be easily extended in a short-length direction. For this reason, the bundle tape more easily adheres to the optical fiber unit, and an outer diameter of the optical fiber unit can be reduced.

The number, shape, and arrangement of the slits S may be freely selected, and are not limited to the one illustrated in FIG. 5.

Figure 6:
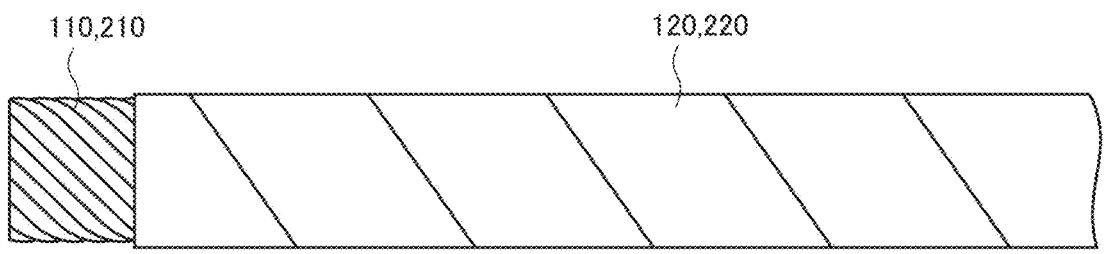
FIG. 6 is a side view illustrating a second exemplary modification of the optical fiber unit.

For example, while the bundle tape is longitudinally wrapped around the optical fiber ribbon bundle in each of the above-described exemplary embodiments, as illustrated in FIG. 6, which is a side view illustrating a second exemplary modification of the optical fiber unit, the bundle tape may be spirally wrapped around the optical fiber ribbon bundle.

In the exemplary embodiment, while specific numerical values are indicated for the diameter of the optical fiber and the thickness of the bundle tape, these numerical values are merely examples and are not limited thereto.

What is claimed is:

1. An optical fiber unit comprising:
   a plurality of optical fiber ribbons, each in which a plurality of optical fibers are arranged in parallel; and
   a colored bundle tape which is longitudinally wrapped or spirally wrapped around an optical fiber ribbon bundle in which the plurality of optical fiber ribbons are stranded together,
   wherein one end portion in a width direction of the bundle tape and the other end portion in the width direction of the bundle tape overlap each other and are joined to each other entirely in a longitudinal direction of the bundle tape, and
   the bundle tape covers an entire circumference of the optical fiber ribbon bundle without a gap in a circumferential direction of the optical fiber ribbon bundle.

2. The optical fiber unit according to claim 1,
   wherein an identification mark is provided on an outer surface of the bundle tape.

3. The optical fiber unit according to claim 1,
   wherein a slit extending in the longitudinal direction of the bundle tape is formed in the bundle tape.

4. The optical fiber unit according to claim 1,
   wherein the bundle tape is a tape that shrinks when heat is applied thereto.

5. An optical fiber cable, wherein the plurality of optical fiber units according to claim 1 are housed in a cable sheath.

6. The optical fiber unit according to claim 1,
   wherein the one end portion in the width direction of the bundle tape and the other end portion in the width direction of the bundle tape are directly joined to each other.

* * * * *